Patented Nov. 1, 1932

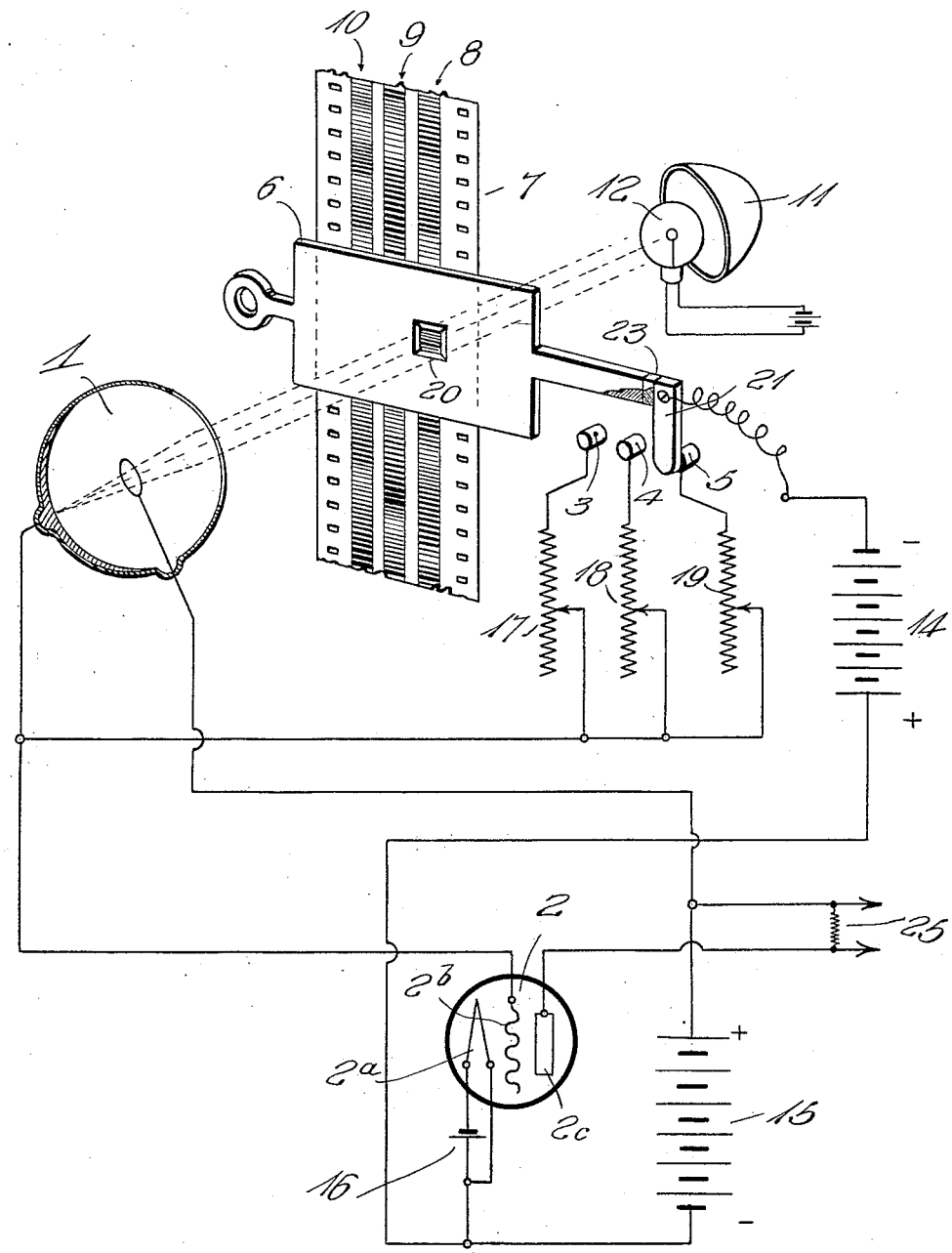

1,886,125

UNITED STATES PATENT OFFICE

GORDON BROWN SCHEIBELL, OF NEWARK, NEW JERSEY

PHOTOCELL COMPENSATING SYSTEM

Application filed August 1, 1930. Serial No. 472,370.

My invention relates broadly to light sensitive control circuits and more particularly to a compensation system for automatically compensating for permanent variations which tend to produce errors in the operation of light sensitive control circuits.

One of the objects of my invention is to provide a compensation circuit for light sensitive systems having means adapted to prevent change in the output of the light sensitive control circuit due to variations in structure which may occur within the light sensitive device.

Another object of my invention consists in producing a compensating circuit system for photo-sensitive resistances in which means are provided for compensating for extraneous and undesirable changes produced in the effective resistance of the circuit by relative movement of the photo-sensitive resistance and an exciting light therefor.

Still another object of my invention consists in producing a photo-electric cell compensation system in which a variable resistance is provided to compensate for changes in the effective resistance of a photocell circuit brought about by altering the relation of an exciting light with reference to the photo-electric cell.

A further object of my invention consists in producing a photoelectric cell compensation system in which light is selectively directed through a plurality of adjacent longitudinal portions of a photographic film upon the light sensitive cathode of a photoelectric cell and in which means are provided for avoiding undesirable changes in resistance of the photoelectric cell brought about by nonuniformity of the cathode structure.

A still further object of my invention consists in providing a photoelectric cell compensation system in which a photographic film is interposed between a photoelectric cell and an exciting light therefor and in which a calibrated resistance is provided to maintain the effective resistance of the photoelectric cell at a predetermined value when different parts of the photoelectric cell cathode are exposed to light rays.

Another object of my invention consists in providing a photoelectric cell system in which several conditions for varying the resistance of a photoelectric cell are present and in which means are provided for compensating for all of the resistance variations except one.

Other and further objects of my invention reside in the circuit arrangement described in the following specification and shown in the accompanying drawing which diagrammatically shows the compensation system of my invention.

In an electrical system for transforming light impulses into electrical impulses, there are two difficulties to be encountered. First, the photo-sensitive, or cathode, structure of the cell itself is not uniform. That is to say, if a beam of light is moved from one part of the cell to another, there will be a change in resistance even though the light beam remain of constant intensity. Second, the light which falls upon the cathode of the cell must be maintained at a constant basic intensity. In an electrical translating system there is usually some means for varying the intensity of the light in accordance with certain effects which are to be translated into electrical impulses. For example, in sound reproduction by films, the intensity of the light reaching a photo cell is altered in intensity by silver deposits on the film which correspond to sound waves. The light beam passing through this film and falling on the cathode of the photo cell must therefore have a basic, or initial, intensity which is substantially constant, or the intensity variations caused by the film will not be faithful reproductions of the sound record. Such a statement is equally true of other uses to which a photo cell is put, such as in television. In any case, if the basic intensity of the exciting light varies, or if the light beam is shifted from one part of the photo-sensitive structure of the cell to another, the effective resistance of the photo cell will be altered in a disturbing manner which distorts the true values of the expected translations.

In my copending application Ser. No. 440,541 filed March 31, 1930, issued as Patent No. 1,837,267, March 1, 1932, I have described a photo cell optical system in which means are provided for establishing a plurality of light beams of equal intensity and means for converging these beams on a constant portion of a photo sensitive cell. In this application, the means so provided maintain the optical and photo sensitive components of the translation system at constant values at all times, the only variable quantity being the modulating element, such as a sound film.

In the present invention, I provide a photo cell system in which the optical and photo-sensitive components are subject to variations, the same being compensated by changes in the values of the electrical circuit of which the cell is a part. In other words, I provide means for compensating for disturbing effects caused by changes in effective resistance by movement of light over different portions of the cell.

For the purpose of explaining my invention, the employment thereof as used in combination with a sound film will be illustrated, but it is not intended that its use shall be limited thereto. Other uses, especially in television, will readily occur to those skilled in the art.

In the drawing I show a multi-channel sound film 7 intercepting light rays from the light source 12 and reflector 11. These light rays pass through the sound tracks 8, 9, and 10 on the film 7 but are selectively chosen by the shutter 6 which brings the aperture 20 opposite any desired sound track. In the drawing, the aperture is opposite the sound channel 8, the light modulated thereby being permitted to pass on to the photo-electric cell 1. The photo-electric cell 1 is connected to control the operation of amplifier 2. The amplifier is illustrated diagrammatically as including a cathode 2a heated from battery 16, a control grid 2b, a plate 2c and a source of plate potential 15. The work circuit of the amplifier extends to a suitable load represented at 25 such as additional stages of amplification or to a sound reproducer circuit. The light rays defined by the aperture 20 when opposite the sound track 9 will obviously be of different intensity than the intensity of the beam formed by the aperture 20 when opposite the sound track 8 inasmuch as the light will be traversing different distances from the light source to the cathode of the photo cell. Further, the light beams so defined at different positions will fall on different parts of the photo-sensitive cathode of the photo electric cell. Due to non-uniformity of the cathode structure, this will cause a non-uniform change in resistance. If the aperture 20 is moved opposite the sound channel 10, there will still be another change of both the light beam and photo cell resistance. It will be noted that either a change in intensity of the light beam or a change in point of incidence with the cathode will produce a change in resistance. In the present description, both changes are considered as occurring simultaneously and are therefor additive. It is of course possible that the light beams could be maintained at constant intensity of illumination by deriving them as set forth in my photo cell optical system hereinbefore identified, and yet produce disturbing changes of resistance in the photo cell by shifting the point where the light beam falls on the cathode. It is of course also possible that the point of incidence with the cathode might remain constant while the light intensity changes. At any rate, both cases will be considered simultaneously in this specification.

To compensate for these disturbing changes in resistance of the photo cell, I provide an arm 21 affixed to the shutter 6 so that it moves therewith. This arm is electrically insulated from the shutter 6 as indicated at 23 but makes selective slidable connection with three contacts 3, 4, and 5 which are in series connection with three adjustable resistances 17, 18 and 19 respectively. The arm 21, being in series with the "C" battery 14, supplies current, through a selected one of the resistances 17, 18 and 19, to the photo cell 1 and which is of the proper value to correspond to, and compensate for, the disturbing changes in resistance of the photo cell brought about by shift of light beam and change in light intensity. The proper values of these resistances can be arrived at by calibrating the photo cell circuit in accordance with the characteristics of the photo cell structure and in accordance with the predetermined shifts of the light beam. It is of course obvious that other parts of the photo electric circuit may equally well be varied to produce compensating changes. Further, the selection of these values is not necessarily limited to an arm mounted on a shutter, but could be any convenient means, such as an independent switch manually or automatically controlled.

While I have described my invention in one of its preferred embodiments I desire that it be understood that changes may be made and that no limitations are intended other than are imposed by the scope of the appended claims.

What I claim as new and desire to secure by Letters Patent of the United States is as follows:

1. A photo-sensitive cell compensation system comprising a source of irradiations, a photo-sensitive cell under control of said irradiations, an output circuit for said cell, a film interposed between said source of irradiations and said photo-sensitive cell, a shutter movable with respect to said film for selectively exposing different longitudinal portions of said film to said cell, and means under control of said shutter adapted to alter the constants of said circuit by predetermined values in definite relationship with the movement of said shutter.

2. A photo-sensitive cell compensation system comprising a source of irradiations, a photosensitive cell under control of said irradiations, a circuit for said cell including an adjustable resistance, a film interposed between said source of irradiations and said cell, a movable aperture plate adapted to selectively expose different longitudinal portions of said film, and means under control of said aperture plate, said means being adapted to render effective a selected value of said resistance in said circuit to compensate for certain effects produced in said photosensitive cell due to the movement of said aperture plate whereby the operation of said circuit is maintained substantially uniform irrespective of such changes.

3. A photoelectric cell compensation circuit comprising an electron tube having input and output circuits, a multiple channel sound record, a source of light focused upon said multiple channel sound record, a photoelectric cell connected with said circuits, an aperture plate adapted to be moved to a multiplicity of different positions for selectively directing light rays passing through a selected sound channel upon said photoelectric cell, and means controlled by the movement of said aperture plate for maintaining operating characteristics of said electron tube circuit substantially constant irrespective of changes in the position of incidence of the light rays on said photoelectric cell.

4. In a light sensitive cell circuit, an electron tube having a circuit to be controlled and a controlling circuit, a light sensitive cell connected in said controlling circuit, power energizing means for said circuits, a source of light rays, a multiple sound channel film record disposed in the path of said light rays, an aperture plate having a multiplicity of positions corresponding to the number of sound channels on said film record and adapted to selectively expose said light sensitive cell to the effects of light rays passing through a particular sound channel, and means actuated by the change in position of said aperture plate for varying the effective value of said power energizing means to compensate for certain effects produced in said cell due to a change in position of said aperture plate for maintainig the operation of said circuit to be controlled substantially uniform irrespective of such effects.

5. In a light sensitive cell circuit, an electron tube having a circuit to be controlled and a controlling circuit, a light sensitive cell connected in said controlling circuit, power energizing means for said circuits, a source of light rays, a multiple sound channel film record disposed in the path of said light rays, an aperture plate having a multiplicity of positions corresponding to the number of sound channels on said film record and adapted to selectively expose said light sensitive cell to the effects of light rays passing through a particular sound channel, a multiplicity of independently adjustable resistors disposed in circuit with said power energizing means, a switching device for rendering effective a selected resistor in circuit with said power energizing means and effectively in circuit with said electron tube circuits for varying the influence of said power energizing means upon said electron tube circuits for maintaining the operation of said circuit to be controlled substantially uniform, and a member common to said aperture plate and said switching device for causing the simultaneous movement thereof.

6. In a compensating system, photosensitive means, means for producing irradiations for said photosensitive means, an electrical circuit external of said photosensitive means, a plurality of film recorded sound tracks, and means interposed in the path of said irradiations and adapted to simultaneously alter the constants of said external circuit and direct said irradiations through a selected one of said sound tracks to said photosensitive means.

7. A photosensitive cell compensating system comprising, a source of irradiations, a photosensitive cell, a circuit connected to said cell, an aperture plate interposed between said source of irradiations and said photosensitive cell, for causing irradiations to fall on a predetermined area of said photosensitive cell, an adjustable electrical control device for altering the constants of said circuit and means for simultaneously moving said aperture plate and said adjustable control device.

8. A compensating system comprising a source of irradiations, a photosensitive cell under control of said irradiations, a circuit for said cell, a film interposed between said source of irradiations and said cell, means for causing said irradiations to sequentially pass through different longitudinal portions of said film to said cell, and means under control of said last mentioned means for altering the contents of said circuit by predetermined values.

9. A compensating system comprising photosensitive means, means for producing irradiations incident upon said photosensitive means, an electrical circuit external of said photosensitive means and having a plurality of different values of circuit constants, and means movable in the path of said irradiations for causing changes in the incidence of said irradiations with respect to said photosensitive means, said means being adapted to render selected values of said circuit constants effective in said circuit to compensate for said changes in the incidence of said irradiations on said photosensitive means whereby the operation of said circuit is maintained substantially uniform irrespective of said changes.

In testimony whereof I affix my signature.

GORDON BROWN SCHEIBELL.

CERTIFICATE OF CORRECTION.

Patent No. 1,886,125. November 1, 1932.

GORDON BROWN SCHEIBELL.

It is hereby certified that error appears in the printed specification of the above numbered patent requiring correction as follows: Page 3, line 125, claim 8, for "contents" read "constants"; and that the said Letters Patent should be read with this correction therein that the same may conform to the record of the case in the Patent Office.

Signed and sealed this 3rd day of January, A. D. 1933.

(Seal)

M. J. Moore,
Acting Commissioner of Patents.